(12) United States Patent
Guan et al.

(10) Patent No.: US 11,823,019 B2
(45) Date of Patent: Nov. 21, 2023

(54) EARLY PATTERN DETECTION IN DATA FOR IMPROVED ENTERPRISE OPERATIONS

(71) Applicant: Accenture Global Solutions Limited, Dublin (IE)

(72) Inventors: Lan Guan, Johns Creek, CA (US); Guanglei Xiong, Pleasanton, CA (US); Wenxian Zhang, San Jose, CA (US); Sukryool Kang, Dublin, CA (US); Anwitha Paruchuri, San Jose, CA (US); Jing Su Brewer, San Jose, CA (US); Ivan A. Wong, Edison, NJ (US); Christopher Yen-Chu Chan, Jersey City, NJ (US); Danielle Moffat, Highlands Ranch, CO (US); Jayashree Subrahmonia, San Jose, CA (US); Louise Noreen Barrere, Torrance, CA (US)

(73) Assignee: Accenture Global Solutions Limited, Dublin (IE)

(*) Notice: Subject to any disclaimer, the term of this patent is extended or adjusted under 35 U.S.C. 154(b) by 259 days.

(21) Appl. No.: 17/370,434

(22) Filed: Jul. 8, 2021

(65) Prior Publication Data
US 2022/0300854 A1  Sep. 22, 2022

Related U.S. Application Data

(60) Provisional application No. 63/164,159, filed on Mar. 22, 2021.

(51) Int. Cl.
*G06N 20/00* (2019.01)
*G06Q 10/0633* (2023.01)
*G06N 5/02* (2023.01)

(52) U.S. Cl.
CPC ............. *G06N 20/00* (2019.01); *G06N 5/02* (2013.01); *G06Q 10/0633* (2013.01)

(58) Field of Classification Search
CPC ....... G06N 20/00; G06N 5/02; G06Q 10/0633
See application file for complete search history.

(56) References Cited

U.S. PATENT DOCUMENTS

| 10,855,706 B2 | 12/2020 | Choudhury et al. |
| 2019/0034780 A1 | 1/2019 | Marin et al. |

(Continued)

FOREIGN PATENT DOCUMENTS

| CN | 107409126 | 3/2021 |
| EP | 3262815 | 10/2020 |

OTHER PUBLICATIONS

AU Office Action in Australian Appln. No. 2022201871, dated Jul. 29, 2022, 3 pages.

(Continued)

*Primary Examiner* — Eric Nilsson
(74) *Attorney, Agent, or Firm* — Fish & Richardson P.C.

(57) ABSTRACT

Implementations of the present disclosure include receiving a goal, providing a problem-specific knowledge graph that is responsive to at least a portion of the goal, determining a set of events from the problem-specific knowledge graph, processing data representative of events in the set of events through a first machine learning (ML) model to provide a set of event scores, each event score in the set of event scores being associated with a respective event in the set of events, determining a sub-set of events based on the set of event scores, for each event in the sub-set of events, determining at least one action by processing a sequence of actions through a second ML model, and outputting the sub-set of events and a set of actions for execution of at least one action in the set of actions.

14 Claims, 8 Drawing Sheets

(56) References Cited

U.S. PATENT DOCUMENTS

| | | |
|---|---|---|
| 2019/0050750 A1* | 2/2019 | Le .......................... G06N 5/01 |
| 2019/0244122 A1* | 8/2019 | Li .......................... G06N 5/022 |
| 2019/0385051 A1 | 12/2019 | Wabgaonkar et al. |
| 2020/0065667 A1* | 2/2020 | Agarwal ................ G06N 7/01 |

OTHER PUBLICATIONS

IN Office Action in Indian Appln. No. 202214014340, dated Jan. 2, 2023, 7 pages.

\* cited by examiner

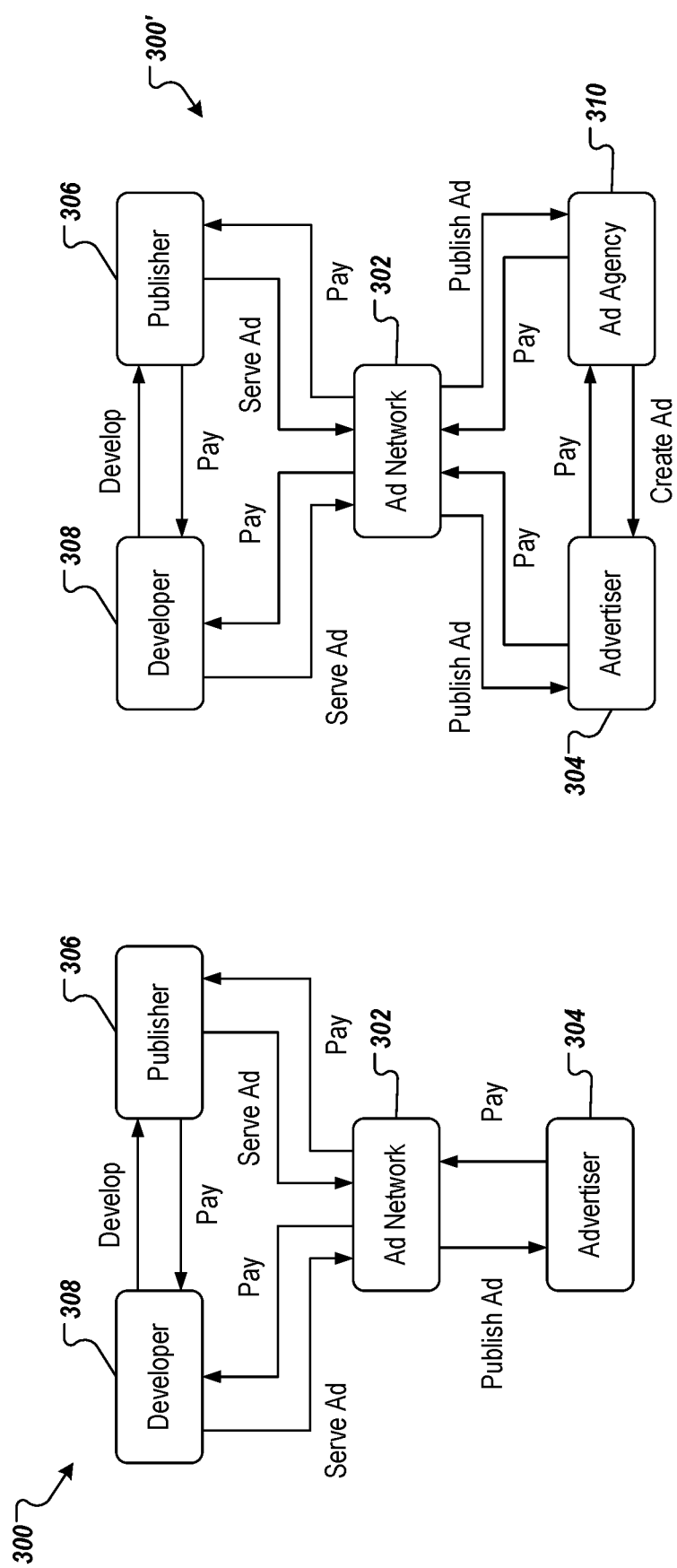

EARLY PATTERN DETECTION IN DATA FOR IMPROVED ENTERPRISE OPERATIONS

CROSS-REFERENCE TO RELATED APPLICATIONS

This application claims priority to U.S. Prov. App. No. 63/164,159, filed on Mar. 22, 2021, the disclosure of which is expressly incorporated herein by reference in the entirety.

BACKGROUND

Enterprises execute operations in connected environments that can include a network of multiple enterprises and customers. For example, and among other contexts, enterprises can operate in business-to-business (B2B) contexts and/or business-to-consumer (B2C). In the B2B context, enterprises provide goods and/or services to other enterprises. In the B2C context, enterprises provide goods and/or services to individuals.

In today's digital, connected world, interactions between enterprises and between enterprises and customers span multiple networks and multiple platforms. Further, such connectivity results in enhancement of the dynamics of interactions as well as the generation of massive amounts of data representative of interactions. For example, in the B2C context, an enterprise can provide products available across multiple e-commerce platforms, each e-commerce platform providing product reviews that can influence operations of enterprises. For example, product reviews can influence not only the enterprise providing a product, but can also influence enterprises along the supply chain in provisioning the product. That is, interactions in the B2C context can influence the B2B context and vice-versa.

In view of this, enterprises seek to analyze data in an attempt to detect dynamics (e.g., emerging marketplace trends) that may influence operations of the enterprises. While various computer-implemented tools have been developed to support so-called big-data analytics, such tools suffer from technical deficiencies. For example, traditional tools attempt to detect dependencies between enterprises, but are unable to capture useful signals from noisy data and/or recognize patterns in instances of incomplete information. Further, models used by such tools are unable to keep pace with the dynamics that result from the connectivity and real-time interactions of the increasingly connected enterprises and customers.

SUMMARY

Implementations of the present disclosure are generally directed to an early pattern detection platform to improve operations of enterprises. More particularly, implementations of the present disclosure are directed to an early pattern detection platform that builds and updates knowledge graphs, that leverages artificial intelligence (AI) to extract web-based data, and that detects domain-relevant patterns based on the knowledge graphs and the web-based data. In some implementations, the early pattern detection platform identifies events and outputs actions that can be executed by enterprises to improve operations of the enterprise.

In some implementations, actions include receiving a goal, providing a problem-specific knowledge graph that is responsive to at least a portion of the goal, determining a set of events from the problem-specific knowledge graph, processing data representative of events in the set of events through a first machine learning (ML) model to provide a set of event scores, each event score in the set of event scores being associated with a respective event in the set of events, determining a sub-set of events based on the set of event scores, for each event in the sub-set of events, determining at least one action by processing a sequence of actions through a second ML model, and outputting the sub-set of events and a set of actions for execution of at least one action in the set of actions. Other implementations of this aspect include corresponding systems, apparatus, and computer programs, configured to perform the actions of the methods, encoded on computer storage devices.

These and other implementations can each optionally include one or more of the following features: determining a set of events from the problem-specific knowledge graph includes mapping at least a portion of entities of the goal to nodes in the problem-specific knowledge graph, and identifying a path within the problem-specific knowledge graph that includes the nodes; events are determined as respective instances of at least one node in the problem-specific knowledge graph; the first ML model processes at least a portion of a sparse feature set through an embedding layer and processes a dense feature set through a hidden layer to provide an event score for a respective event; the second ML model receives a sequence of actions associated with a respective event and predicts a next action in the sequence of actions for the respective event; the second ML model includes a set of transformers that process the sequence of actions; and actions further include, for each event in the set of events, extracting data representative of the event through web sensing.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

FIGS. 3A-3D depict an example representation of building and updating of a portion of a knowledge graph.

DETAILED DESCRIPTION

Figure 1:
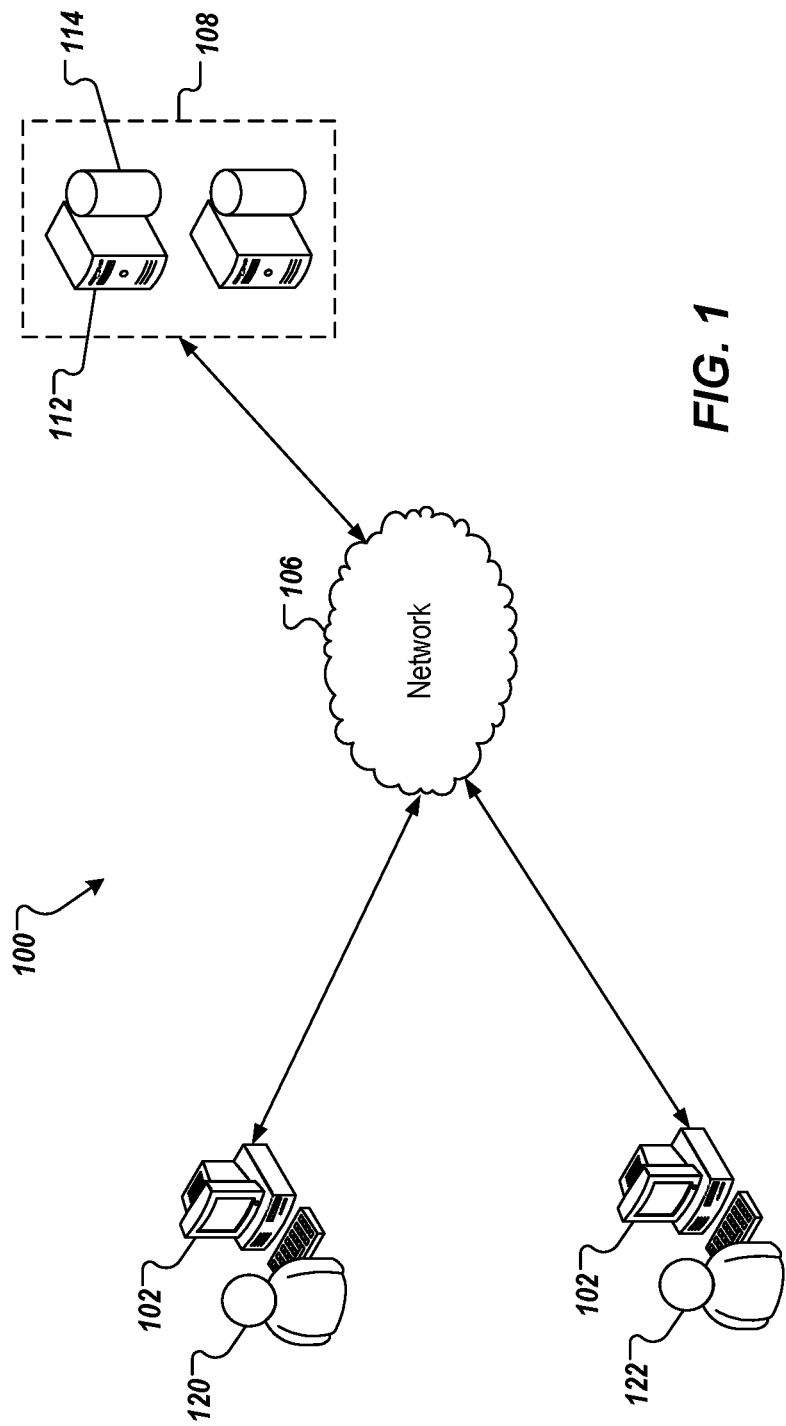
FIG. 1 depicts an example system that can execute implementations of the present disclosure.

Implementations of the present disclosure are generally directed to an early pattern detection platform to improve operations of enterprises. More particularly, implementations of the present disclosure are directed to an early pattern detection platform that builds and updates knowledge graphs, that leverages artificial intelligence (AI) to extract web-based data, and that detects domain-relevant patterns based on the knowledge graphs and the web-based data. In some implementations, the early pattern detection platform identifies events and outputs actions that can be executed by enterprises to improve operations of the enterprise. In some implementations, actions include receiving a goal, providing a problem-specific knowledge graph that is responsive to at least a portion of the goal, determining a set of events from the problem-specific knowledge graph, processing data representative of events in the set of events through a first machine learning (ML) model to provide a set of event scores, each event score in the set of event scores being associated with a respective event in the set of events, determining a sub-set of events based on the set of event scores, for each event in the sub-set of events, determining at least one action by processing a sequence of actions through a second ML model, and outputting the sub-set of events and a set of actions for execution of at least one action in the set of actions.

To provide further context for implementations of the present disclosure, and as introduced above, enterprises execute operations in connected environments that can include a network of multiple enterprises and customers. For example, and among other contexts, enterprises can operate in business-to-business (B2B) contexts and/or business-to-consumer (B2C). In the B2B context, enterprises provide goods and/or services to other enterprises. In the B2C context, enterprises provide goods and/or services to individuals.

In today's digital, connected world, interactions between enterprises and between enterprises and customers spans multiple networks and multiple platforms. Further, such connectivity results in enhancement of the dynamics of interactions as well as the generation of massive amounts of data representative of interactions. For example, in the B2C context, an enterprise can provide products available across multiple e-commerce platforms, each e-commerce platform providing product reviews that can influence operations of enterprises. For example, product reviews can influence not only the enterprise providing a product, but can also influence enterprises along the supply chain in provisioning the product. That is, interactions in the B2C context can influence the B2B context and vice-versa.

In view of this, enterprises seek to analyze data in an attempt to detect dynamics (e.g., emerging marketplace trends) that may influence operations of the enterprises. While various computer-implemented tools have been developed to support so-called big-data analytics, such tools suffer from technical deficiencies. For example, traditional tools attempt to detect dependencies between enterprises, but are unable to capture useful signals from noisy data and/or recognize patterns in instances of incomplete information. Further, models used by such tools are unable to keep pace with the dynamics that result from the connectivity and real-time interactions of the increasingly connected enterprises and customers.

In view of the foregoing, implementations of the present disclosure provide an early pattern detection platform to improve operations of enterprises. More particularly, implementations of the present disclosure are directed to an early pattern detection platform that overcomes technical deficiencies of prior approaches by, for example, building and updating knowledge graphs, leveraging AI to extract web-based data, and detecting domain-relevant patterns based on the knowledge graphs and the web-based data. In some implementations, the early pattern detection platform identifies events from the domain-relevant patterns and outputs actions that can be executed by enterprises to improve operations of the enterprise.

As described in further detail herein, the early pattern detection platform of the present disclosure enables building of knowledge graphs representative of dependencies between enterprises and/or between enterprises and customers, databases of relevant signals (e.g., representative in data) provided from network analysis (e.g., web sensing), and application of reasoning and pattern recognition models for event identification, enrichment, and prioritization. Implementations of the present disclosure enable users to detect subtle patterns of emerging events more effectively and accurately than manual approaches and/or using computer-implemented tools that have technical deficiencies (e.g., do not effectively handle noisy data and/or incomplete information; use models that are less responsive or are slow to respond to dynamics). Implementations of the present disclosure also enable seamless adaptation to dynamics of trends (e.g., emergence of trends) in the marketplace by periodically refreshing knowledge graphs and continuously updating the underlying models.

Implementations of the present disclosure are described in further detail herein with reference to an example context. The example context includes recognizing patterns to generate leads as events and to provide actions for execution of events to improve enterprise operations. In the example context, a lead can include a sales lead (e.g., an opportunity to interact with customers) and an action can include presentation of one or more items to a lead. It is contemplated, however, that implementations of the present disclosure can be realized in any appropriate context. For example, while implementations of the present disclosure are described herein with reference to a commercial context, implementations of the present disclosure can be realized in non-commercial contexts.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114

(e.g., database and knowledge graph structure). In some examples, the back-end system 108 hosts one or more computer-implemented services that users can interact with using computing devices. For example, the back-end system 108 can host an early pattern detection platform in accordance with implementations of the present disclosure. In this example, a user 120 can include an agent of an enterprise (e.g., an employee) that provides one or more goals as input to the early pattern detection system and, in response, the early pattern detection system provides one or more events and, for each event, one or more actions that can be executed to achieve a goal. Also in this example, a user 122 can include an agent of the enterprise (e.g., an employee) that can provide input for creation and/or updating of knowledge graphs (KGs) used by the early detection platform to provide events and actions.

As described in further detail herein, the early pattern detection platform of the present disclosure builds KGs of enterprise dependencies, databases of relevant signals, and applies reasoning and pattern recognition models (ML models) for event generation, enrichment and prioritization. In the example context, the early pattern detection platform enables users to detect subtle patterns of emerging events more efficiently, effectively and accurately than those performed using traditional tools and/or manually.

Figure 2:
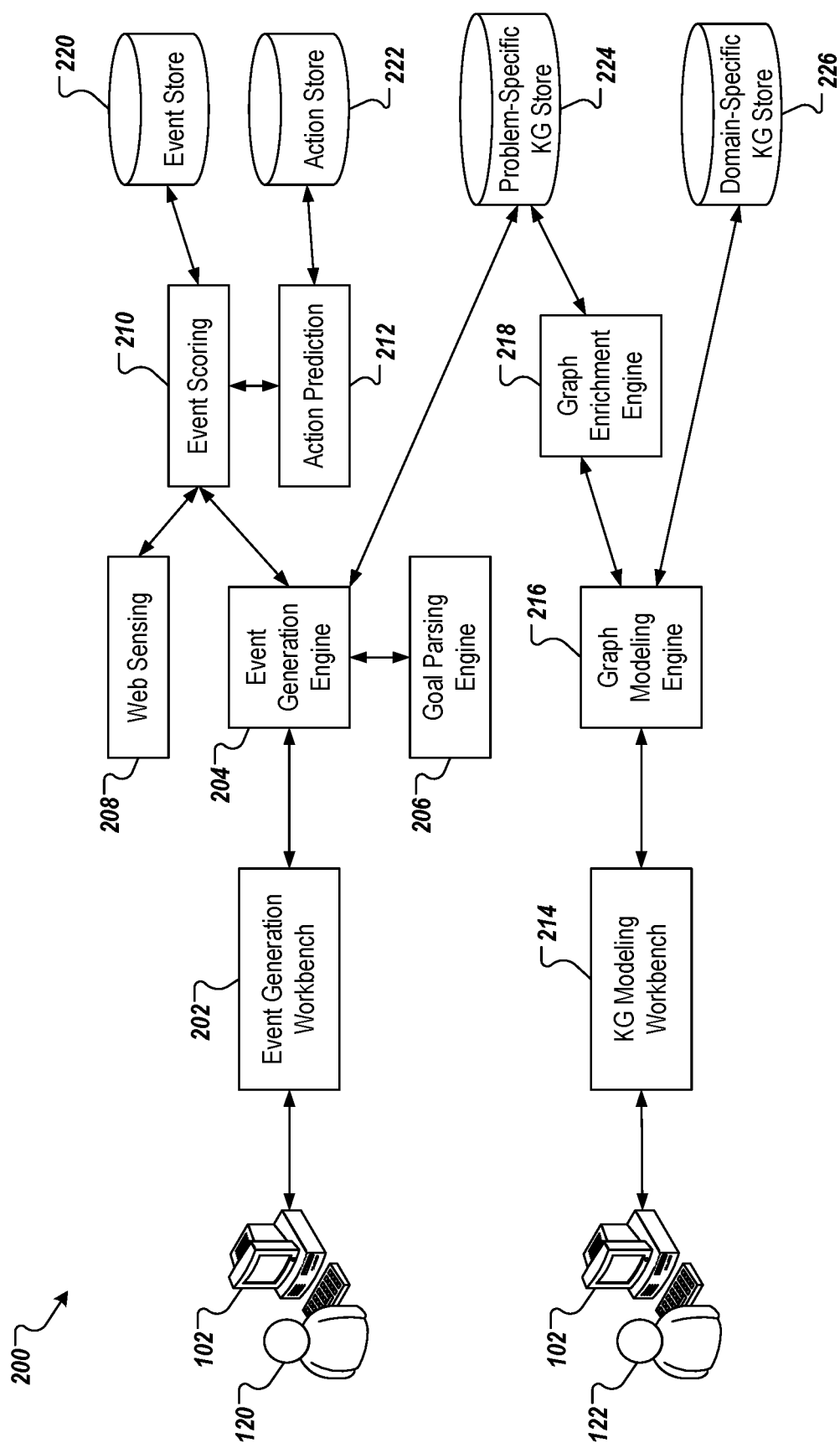
FIG. 2 depicts an example conceptual architecture including an early pattern detection platform in accordance with implementations of the present disclosure.

FIG. 2 depicts an example conceptual architecture 200 including an early pattern detection platform in accordance with implementations of the present disclosure. In the example of FIG. 2, the conceptual architecture 200 includes an event generation workbench 202, an event generation engine 204, a goal parsing engine 206, a web sensing module 208, an event scoring module 210, an event action prediction module 212, an event store 220, an action store 222, a KG modeling workbench 214, a graph modeling engine 216, a graph enrichment engine 218, a problem-specific KG store 224, and a domain-specific KG store 226.

In the non-limiting example context introduced above, an event can include a sales lead, also referred to as a lead herein. For example, the early pattern detection framework assembles web-based data (e.g., provided from the web sensing module 208) and builds a problem-specific KG and a domain-specific KG (e.g., provided from the graph modeling engine 216 and the graph enrichment engine 218) to recognize presence of one or more events that one or more enterprises can act upon, and predicts one or more actions for execution of the one or more events (e.g., using the event scoring module 210 and the event prediction module 212).

In further detail, a goal can be provided to the early pattern detection platform through the event generation workbench 202. For example, the user 120 can interact with the event generation workbench through the computing device 102 to input a goal. In the example of a commercial context, an example goal can include, without limitation, to increase a number of advertisements that small-to-medium sized businesses (SMBs) place in online video games through a particular advertisement network (ad network). In some examples, the goal is provided to the event generation engine 204 to trigger event identification and action prediction for each identified event.

In some implementations, the event generation engine 204 provides the goal to the goal parsing engine 206, which processes the goal to parse the goal into a set of entities and relationships between entities. With non-limiting reference to the example goal above, example entities can include advertisement, SMB, ad network, and online video game.

As introduced above, the early pattern detection platform detects events based on KGs. In general, a KG can be described as a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a company Alpha, a node B represents a product Beta, and an edge E is associated with the relationship "is manufactured by," then having the edge E connect the nodes in the direction from node A to node B in the graph represents the fact that Alpha is the company that manufactures Beta. In some examples, the knowledge graph can be enlarged with schema-related knowledge (e.g., Alpha is a concept Company, Charlie is a concept Company, and "supplies to" is a property or relationship between two entities/instances of concept Company). Adding schema-related information supports evaluation of reasoning results. A knowledge graph can be represented by any of a variety of physical data structures. For example, a knowledge graph can be represented by triples that each represent two entities in order, and a relationship from the first to the second entity; for example, [alpha, beta, is manufactured by], or [alpha, is manufactured by, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers. The entities represented by a knowledge graph need not be tangible things or specific people. The entities can include particular people, places, things, artistic works, concepts, events, or other types of entities. Thus, a knowledge graph can include data defining relationships between companies (e.g., suppliers along a supply chain); data defining relationships between companies and things (e.g., a particular product produced by a particular company); data defining relationships between places and things (e.g., a particular product comes from a particular geographic location); data defining relationships between companies and places (e.g., a company is headquartered in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a company could have a schema defining fields for information such as location, industry, and so on. Such information can be represented by fields in a type-specific data structure, or by triples that look like node-relationship-node triples (e.g., [company identifier, is located, in industry]), or in any other convenient predefined way. In some examples, some or all of the information specified by a type schema can be represented by links to nodes in the knowledge graph; for example, [one company identifier, subsidiary of, another company identifier], where the other company identifier is a node in the graph.

In accordance with implementations of the present disclosure, example KGs include domain-specific KGs and problem-specific KGs. In some examples, a domain-specific KG represents entities and relationships between entities within a respective domain (e.g., telecommunication, mobile gaming, digital advertising). In some examples, a problem-specific KG represents entities and relationships between entities within a respective domain in view of a respective problem that is to be addressed. In the context of implementations of the present disclosure, the problem is provided as the goal that is to be achieved in the early pattern detection.

With continued reference to FIG. 2, one or more domain-specific KGs are provided through the graph modeling engine 216 and are stored in the domain-specific KG store 226. In some examples, a domain-specific KG is wholly created. In some examples, a domain-specific KG is updated (i.e., an existing domain-specific KG is updated to add/remove nodes and/or edges).

In some implementations, a domain-specific KG is provided through a knowledge extraction process and a knowledge fusion process. In some examples, the knowledge extraction process is based on multiple data sources, each of which includes data representative of entities and relationships between entities within a particular domain. Example data sources can include, without limitation, structured data sources (e.g., relational databases), semi-structured data sources (e.g., extensible markup language (XML) documents, Javascript object notation (JSON) documents), and unstructured data sources (e.g., reports, websites). In some examples, data from each of the multiple data sources is received (e.g., by a knowledge extraction engine), which processes the data in entity extraction, relation extraction, and attribute extraction. Entity extraction is executed to identify a set of entities within the data. Example entities can include, without limitation, enterprises (e.g., SMBs, ads networks, publishers, developers, advertisers) and products (e.g., games, mobile applications (APPs), videos). Relation extraction process is executed to identify a set of relationships representing relationships between entities in the set of entities. Example relationships can include, without limitation, relationships between enterprises (e.g., buy from/sell to, develop for/publisher of) and relationships between enterprises and products (e.g., developer of/producer of). Attribute extraction is executed to assign one or more attributes to each entity and/or relationship.

In some examples, the set of entities and the set of relationships are processed through the knowledge fusion process to provide (or update) a domain-specific KG. In some examples, the set of entities and the set of relationships are received (e.g., by a knowledge extraction engine from the knowledge extraction engine), which processes the set of entities and/or the set of relationships through entity alignment, data integration, and conflict resolution. In some examples, entity alignment is executed to disambiguate entities and/or de-duplicate entities. In some examples, data integration is executed to merge aligned entities and disparate relationships into an existing domain-specific KG to provide an updated version of the domain-specific KG. In some examples, conflict resolution is executed to resolve conflicts between entities and/or relationships and/or to filter entities and/or relationships from the domain-specific KG.

With continued reference to FIG. 2, one or more problem-specific KGs are provided through the graph enrichment engine 216 and are stored in the problem-specific KG store 226. In some examples, a problem-specific KG is created by enriching a domain-specific KG with problem-specific nodes and relationships and, for each problem-specific node, one or more instances relevant to the entity represented by the node. Examples are described in further detail herein with reference to FIGS. 3A-3D.

In some implementations, creation and/or updating of domain-specific KGs and/or creation and/or updating of problem-specific KGs can partially include manual input provided from the user 122. For example, the user 122 can interact with the KG modeling workbench 214 to provide input the creation and/or updating of domain-specific KGs and/or creation and/or updating of problem-specific KGs. Example input can include, without limitation, conflict resolution to resolve conflicts between entities and/or relationships.

FIGS. 3A-3D depict an example representation of building and updating of a portion of a domain-specific KG and providing a problem-specific KG. The examples of FIGS. 3A-3D represent the non-limiting context of ad networks in a digital advertising ecosystem. In some examples, an ad network is an enterprise that connects advertisers to digital media (e.g., websites, APPs, digital games, videos) that want to serve advertisements. The key function of an ad network is an aggregation of ad supply from publishers and matching the supply with advertiser demand. The term "ad network" by itself is increasingly used to refer to "online ad network" as the effect of aggregation of publisher ad space and sale to advertisers is most commonly seen in the online space.

With particular reference to FIG. 3A, a domain-specific KG 300 (or at least a portion thereof) is depicted and includes an ad network node 302, an advertiser node 304, a publisher node 306, and a developer node 308. The domain-specific KG 300 further includes relationships between nodes. For example, an ad network represented by the ad network node 302 has a 'Publish Ad' relationship with the advertiser represented by the advertiser node 304, and the advertiser has a 'Pay' relationship with the ad network. Consequently, the domain-specific KG represents the relationship of the advertiser paying the ad network for having advertisements published.

FIG. 3B depicts an example of an update to the domain-specific KG 300 to provide a domain-specific KG 300'. In the example of FIG. 3B, an ad agency node 310 is added to represent an entity (i.e., advertisement agency) that was added to the online ad network and relationships between the ad agency and existing entities in the online ad network since the domain-specific 300 was created, or last updated. In the example of FIG. 3B, the domain-specific KG 300' represents the relationship of the ad agency paying the ad network for having advertisements published, and the relationship of the advertiser paying the ad agency for creating advertisements.

Accordingly, the progression from FIG. 3A to FIG. 3B represents an example of an update of a domain-specific KG. In some examples, domains can be dynamic and can change with relatively high frequency. In view of this, the domain-specific KG can be updated at pre-defined intervals (e.g., hourly, daily, weekly, monthly) and/or in response to one or more triggers (e.g., user command).

Figures 3C, 3D:
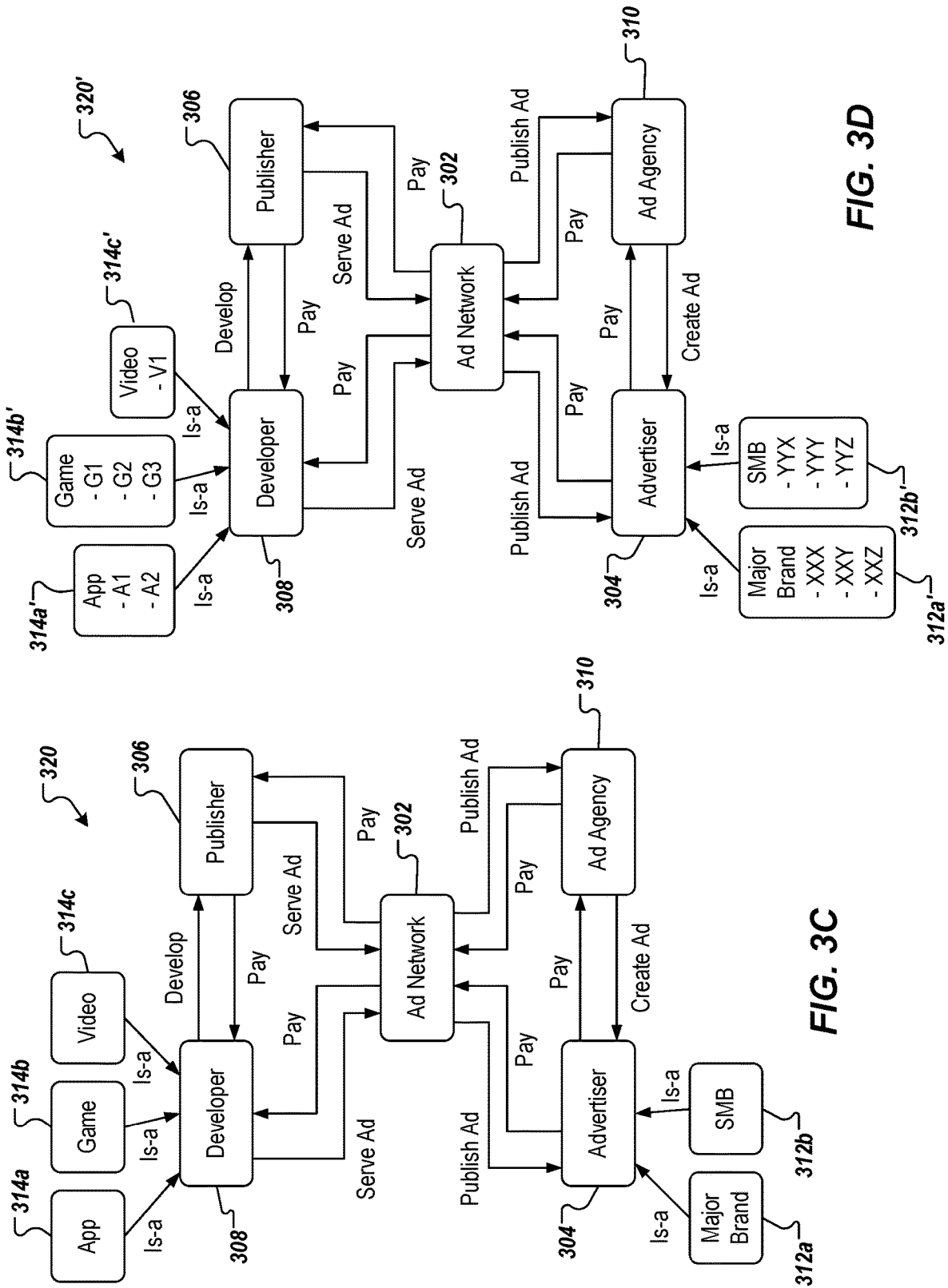

With particular reference to FIGS. 3C and 3D, an example of providing a problem-specific KG will be discussed. As introduced above, a problem-specific KG is provided from a domain-specific KG by enriching the domain-specific KG with problem-specific nodes and, for each problem-specific node, one or more instances relevant to entities represented by the node. In the example of FIG. 3C, a partially enriched domain-specific KG 320 is depicted and is based on the domain-specific KG 300' of FIG. 3B. In the example of FIG.

3C, the domain-specific KG 300' has been enriched with nodes 312*a*, 312*b*, representing respective categories of advertisers, and nodes 314*a*, 314*b*, 314*c*, representing respective categories of developers to provide the partially enriched domain-specific KG 320. The partially enriched domain-specific KG 320 is further enriched to include one or more instances for each of the nodes 312*a*, 312*b*, 314*a*, 314*b*, 314*c* to provide a problem-specific KG 320' of FIG. 3D. That is, nodes 312*a*, 312*b*, 314*a*, 314*b*, 314*c* are enriched with instances to provide enriched nodes 312*a*', 312*b*', 314*a*', 314*b*', 314*c*'. Each instance is a real-world entity that relates to the entity category of the respective node. For example, and in the example of FIG. 3D, instances XXX, XXY, and XXZ are enterprises that advertise and are considered a major brand, while instances YYX, YYY, and YYZ are enterprises that advertise and are considered SMBs.

It is appreciated that the examples of FIGS. 3A-3D are based on a relatively simple KG with relatively few nodes. It is contemplated, however, that implementations of the present disclosure can be realized with more complex KGs that can include much higher numbers of nodes (e.g., hundred, thousands, millions), as well as relationships therebetween.

Referring again to FIG. 2, in response to a goal, the event generation engine 204 retrieves a problem-specific KG from the problem-specific KG store 224. In some examples, the event generation engine 204 queries the problem-specific KG store 224 based on one or more entities parsed from the goal and the problem-specific KG store 224 returns a problem-specific KG in response to the query. For example, and with reference to the non-limiting examples herein, in response to a query including one or more of an advertisement, a SMB, and an ad network, the problem-specific KG store 224 returns the problem-specific KG 320' of FIG. 3D.

In some implementations, the event generation engine 204 processes the problem-specific KG to identify a set of events (e.g., one or more events). In some examples, the set of events is determined based on the goal as a path-finding problem within the problem-specific KG. For example, the entities determined from the goal are mapped to nodes in the problem-specific KG (e.g., find corresponding nodes by cosine similarity score by word embeddings, such as word2vec). The nodal value of the corresponding node is assigned to be the cosine similarity score, while the nodal value for any other node is zero. Using the non-limiting examples herein, SMB, ad network, and game of the example goal can be mapped to the nodes 312*b*', 302, 314*b*'. In view of this, one or more paths through the problem-specific KG that satisfy the goal and that cover the key terms (i.e., includes the identified nodes) are determined. To determine a specific path that is to be used, the problem is formulated and solved as the minimal finding path on the graph. In some examples, the minimal path is determined by computing the minimal distances between any given pairs of corresponding nodes by finding all-pairs shortest paths and followed by identifying the path with shortest distance connecting all corresponding nodes as in the so-called traveling salesman problem. In some examples, an average nodal value is determined for the minimal path and is compared to a threshold. If the average nodal value is above the threshold, the path is returned. Otherwise, a failure is indicated.

In some examples, events that may be relevant to intents are determined from the target node of the input goal provided from the returned path. In the example of FIG. 3D, the instances YYX, YYY, and YYZ of the node 312*b*' can be returned as events (e.g., leads in the example context). For example, for the example goal of increasing a number of advertisements that SMBs place in online video games through a particular ad network, the instances YYX, YYY, and YYZ of the node 312*b*' represent SMB's that could increase advertisements.

In some examples, the output of the event generation engine 204 is a set of events (e.g., one or more events). The set of events is provided to the event scoring module 210, which provides an event score for each event. More particularly, the event scoring module scores each event based on data associated with the event from a plurality of data sources. In some implementations, the data is provided by the web sensing module 208, which executes web crawling functionality and leverages AI to retrieve data representative of the event. In the example context of an event including a lead (e.g., an enterprise that can be sold to), the data includes data representative of the lead (the enterprise).

Figure 4:
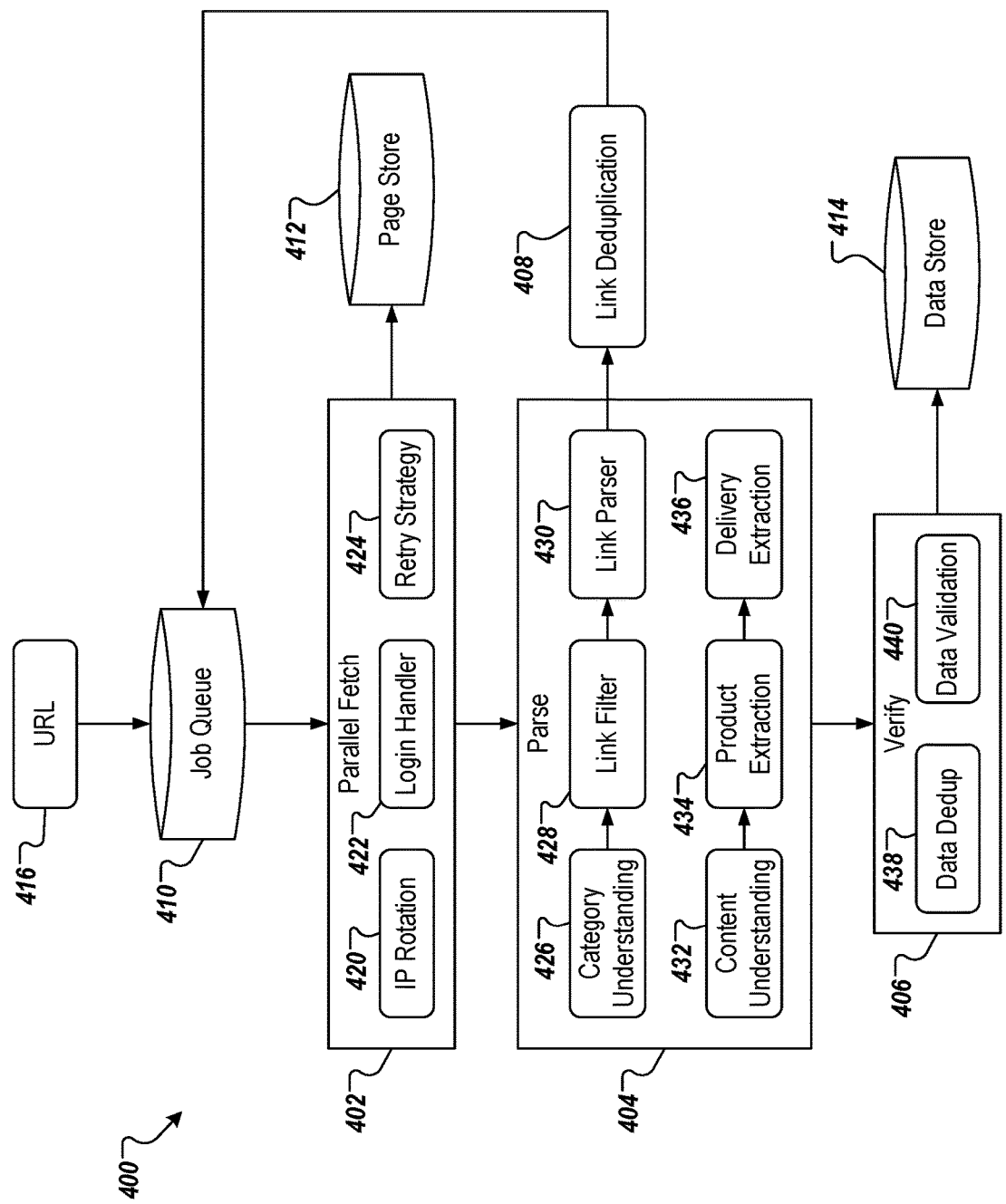
FIG. 4 depicts an example architecture for web sensing using artificial intelligence (AI) in accordance with implementations of the present disclosure.

FIG. 4 depicts an example architecture 400 for web sensing using artificial intelligence (AI) in accordance with implementations of the present disclosure. In the example of FIG. 4, the architecture 400 includes a parallel fetch module 402, a parse module 404, a verify module 406, a link deduplication module 408, a job queue store 410, a page store 412, and a data store 414. In some examples, the architecture processes a uniform resource locator (URL) 416 of a set of URLs, to extract data from an underlying resource (e.g., web page) and store the data in the data store 414. In some examples, the URLs may come from one or multiple sources including URLs extracted from systems captured inside an enterprise or supplied by the partners or third party vendors of the enterprise, URLs derived from search engine results by querying known SMB names, or URLs sourced from links from any other public websites.

In further detail, for each URL, a job queue is generated and is stored in the job queue store 410. As jobs are processed, the parallel fetch module 402 fetches the URLs (e.g., web page) to extract data therefrom. In the example of FIG. 4, the parallel fetch module 402 includes an IP rotation sub-module 420, a login handler module 422, and a retry strategy module 424. The IP rotation sub-module 420 can execute rotation of IP addresses, from which URLs are requested (e.g., to mitigate anti-scraping measures). In some examples, the login handler 422 manages logins to URLs that require login (e.g., entry of username/password). In some examples, the retry strategy sub-module 424 implements one or more retry strategies for fetching URLs, if fetches are initially unsuccessful. Retrieved web pages from URLs are stored in the page store 412.

Each web page is provided to the parse module 404, which processes the web pages to extract data therefrom. In the example of FIG. 4, the parse module 404 includes a category understanding sub-module 426, a link filter sub-module 428, a link parser sub-module 430, a content understanding module 432, a product extraction module 434, and a delivery extraction module 436. In some examples, each of the category understanding sub-module 426, the content understanding module 432, the product extraction module 434, and the delivery extraction module 436 are automated using AI (e.g., processing of data using ML models) to process web pages and identify categories and content, as well as extract product data and shipping data. Further, links provided in web pages (e.g., URLs to other web pages) are filtered and parsed, and are provided to the link deduplication module 408. In this manner, URLs extracted from web pages can be handled as respective jobs, some being filtered from handling, if they are duplicates of other URLs that are already being handled (i.e., only unique URLs are processed).

In some implementations, product data and shipping data are provided to the verify module 406 for further processing and eventual storage in the data store 414. In some examples, product data includes, without limitation, product name, category, description, product number (e.g., unique identifier assigned to product), and the like. In some examples, a product can be a physical product or a service. In some examples, shipping data includes, without limitation, data representative of a manner, in which the product is provided (e.g., physically shipped to an address, online download). In the example of FIG. 4, the verify module 406 includes a data de-duplication sub-module 438 and a data validation sub-module 440, which process the product data and the shipping data to remove any duplicate data (e.g., data already accounted for and stored in the data store 214) and ensure the data is valid (e.g., is in an appropriate format for further processing).

In some implementations, an event score is determined for each event and, for each event having an event score that exceeds a threshold event score, an action is determined. The event score for an event is determined based on data representative of the event, which is retrieved through web sensing, as described herein with reference to FIG. 4. In some implementations, event scores are determined by processing the data through a ML model, which provides an event score for a respective event.

Figure 5:
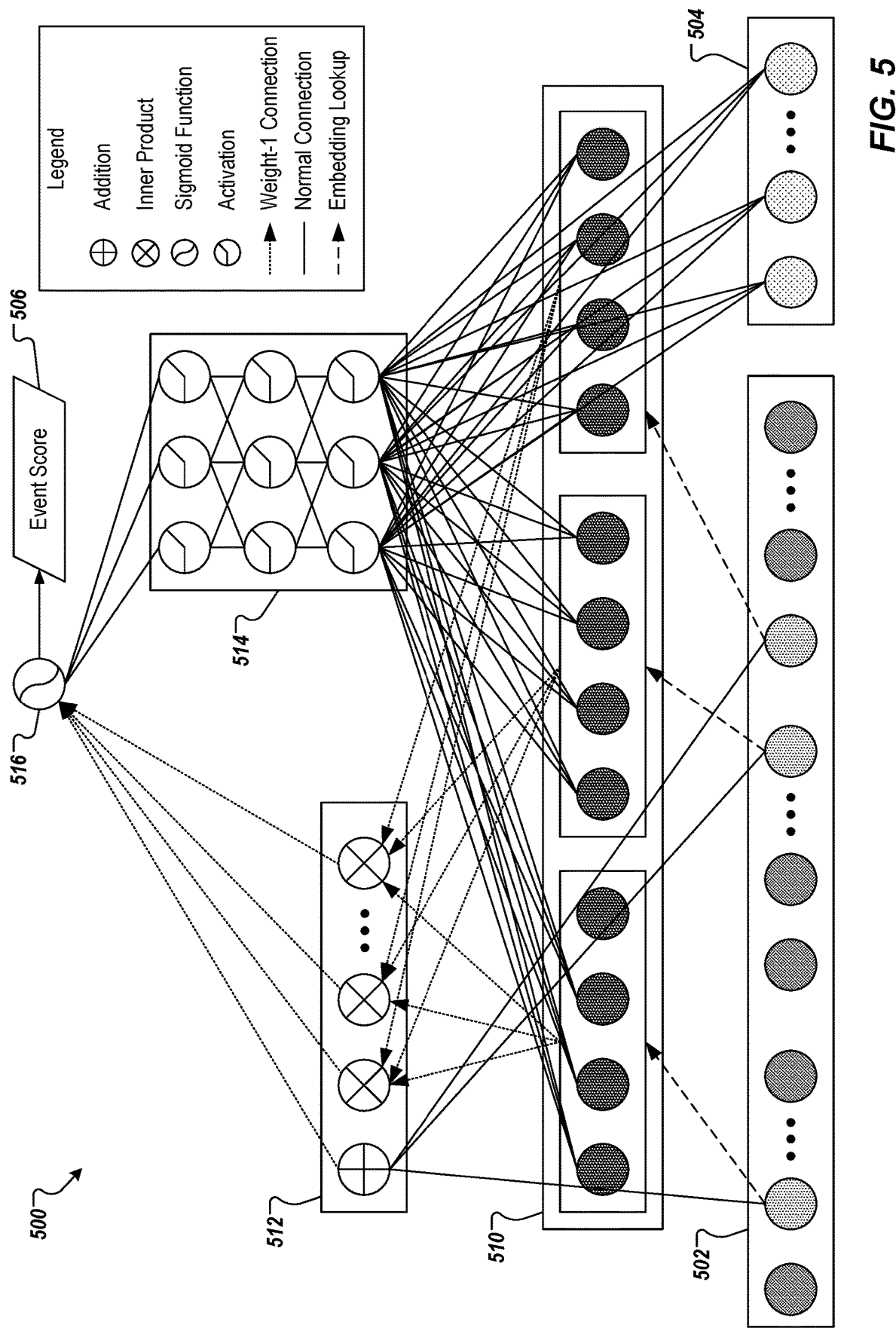
FIG. 5 depicts an example machine learning (ML) model to score events in accordance with implementations of the present disclosure.

FIG. 5 depicts an example ML model 500 to score events in accordance with implementations of the present disclosure. The example ML model 500 receives a sparse feature set 502 and a dense feature set 504, which are representative of an event, and processes each to provide an event score 506. In the example of FIG. 5, the ML model 500 includes an embedding layer 510, a factorization-machine layer 512, a hidden layer 514, and a sigmoid function 516.

In some implementations, each of the sparse feature set 502 and the dense feature set 504 is provided from the data extracted for a respective event from web sensing (discussed herein with reference to FIG. 4). Accordingly, for a particular event, a sparse feature set 502 and a dense feature set 504 is provided and a respective event score 506 is generated based thereon. In the example context of a lead, where an event is a sales lead, such as an enterprise that is to be marketed to, example sparse features in the sparse feature set 502 are categorical attributes with fixed set of values, which can include, without limitation, address information (e.g., state, city, country), revenue data, number of employees, industry type, products, and the like. Example dense features in the dense feature set 504 are typically numerical attributes, which can include, without limitation, website statistics (e.g., website traffic), review scores, and the like.

In some implementations, a sub-set of sparse features is provided to the embedding layer 510, which provides embeddings for each sparse feature in the sub-set of sparse features. In some examples, an embedding is provided as a multi-dimensional representation (e.g., a multi-dimensional vector) of a respective sparse feature. The sparse features in the sub-set of sparse features and their respective embeddings are provided to the factorization-machine layer 512, which processes each to provide a set of scalar values as output to the sigmoid function 516. In some implementations, portions of each of the embeddings and each of the dense features in the dense feature set 504 are provided as input to the hidden layer 514, which processes each through a series of non-linear transformations (e.g., N layers of non-linear transformations) to provide output to the sigmoid function 516. The sigmoid function 516 processes the input received from the factorization-machine layer 512 and the hidden layer 514 to provide a score (e.g. scalar value) for the event. This process is performed for each event that is identified from the goal (e.g., as described herein with reference to FIG. 3D) to provide a set of scored events (e.g., event—score pairs).

In some implementations, events are ranked based on respective scores. In some examples, events having higher scores are ranked more highly than events having lower scores. The ranked events enable targeted actions to be determined for more promising outcomes. For example, more highly ranked events indicate that, based on the data retrieved from web sensing, the event is more likely to achieve the goal than lower ranked events. In some examples, a threshold score can be used to determine events that are to be considered for further processing (e.g., determining actions that can be executed). For example, one or more actions are determined for only those events with a score that meets or exceeds the threshold score.

Figure 6:
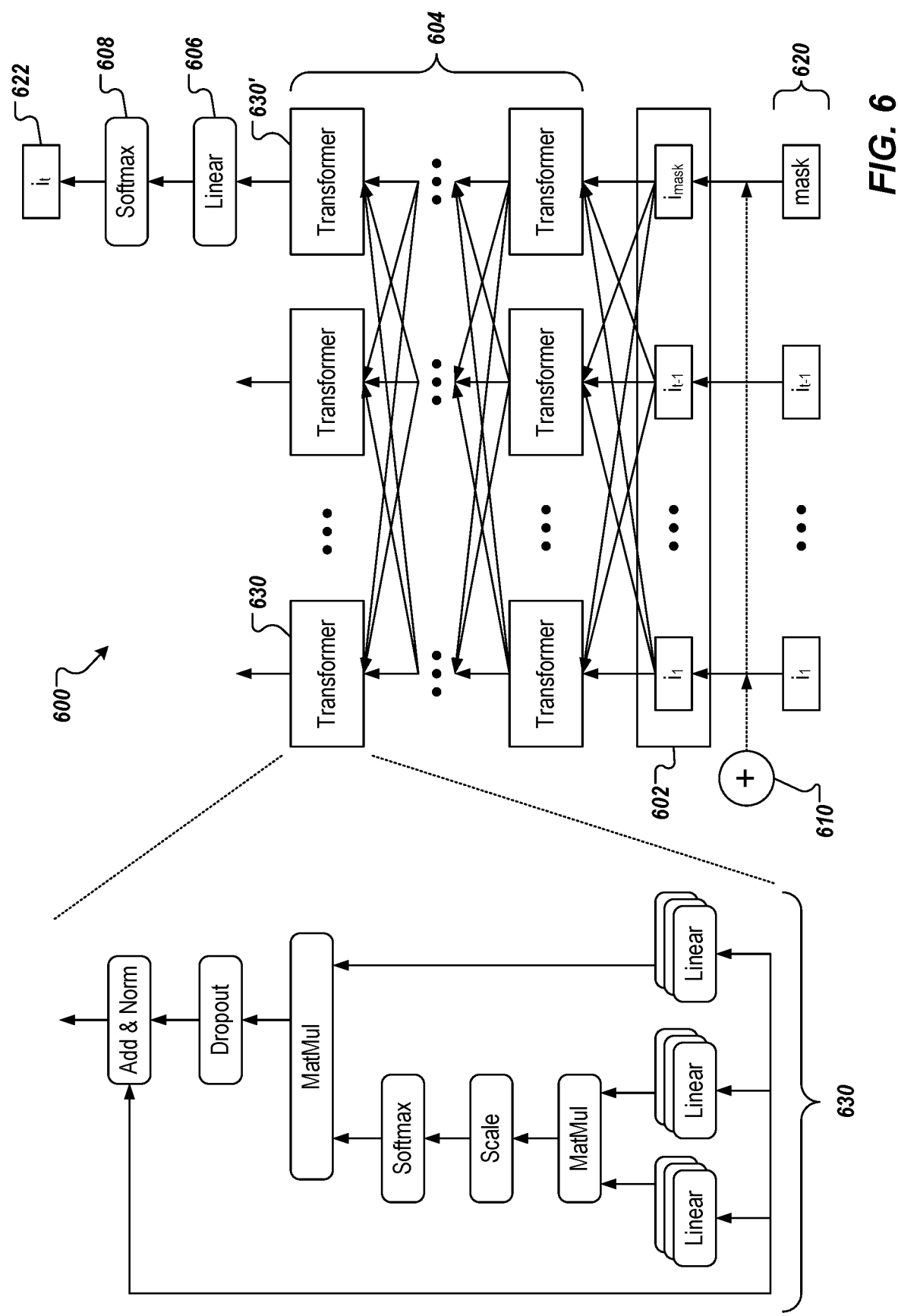
FIG. 6 depicts an example ML model to determine an action for an event in accordance with implementations of the present disclosure.

FIG. 6 depicts an example ML model 600 to determine an action for an event in accordance with implementations of the present disclosure. In the example of FIG. 6, the ML model 600 includes an embedding layer 602, a transformer layer 604, a linear layer 606, a softmax layer 608, and a position encoder 610. The ML model 600 receives an action sequence 620 and processes the action sequence 620 to predict a next action 622 in the action sequence. In the context of the present disclosure, the next action 622 represents an action that can be performed with respect to an event. For example, in the case of a lead, the next action 622 is a product or service that can be communicated to the lead (enterprise) in an effort to provoke a sale of the product or service to the lead.

In some implementations, in a sequence action prediction, $U=\{u_1, u_2, u_n\}$ denotes a set of events, $I=\{i_1, i_2, i_m\}$ denotes a set of actions, and $S_u=[i_1{}^u, \ldots i_t{}^u \ldots i_T{}^u]$ denotes an interaction sequence in chronological order for event $u \in U$, where $i(u) \in I$ is the action that u has interacted with at time step t and T is the length of interaction sequence for event u. The set of actions is input to the ML model 600, which predicts an action $i_t$ for the given input sequence. That is, for the event u, the action $i_t$ is the next action that should be taken. In the example context of events as leads, actions can include products or services that can be presented to an enterprise (i.e., the lead) and the action $i_t$ is the specific product/service that should be presented in view of the given input sequence.

In further detail, the action sequence 620, which includes a mask for the to-be-predicted action $i_t$ is provided as input to the embedding layer 602. In some examples, the position encoder 610 encodes respective positions of the actions within the action sequence 620 before being input to the embedding layer 602. In some examples, for each action in the action sequence 620, the embedding layer provides an embedding (e.g., a multi-dimension representation of the action, such as a vector representation). The embeddings are each provided as input to the transformer layer 604, which includes multiple layers of transformers 630. For example, the transformer layer 630 can include n layers of transformers 630 with each layer having m transformers 630. Accordingly, a set of transformers can range from 1, 1 to n, m.

Details of an example transformer 630 are depicted in FIG. 6. The transformers 630 can be described as deep learning (DL) models applying the mechanism of attention, differentially weighing the significance of each part of the output data from the embedding layer 602. The output of the final transform 630' (e.g., the transformer n, m) is a vector, which then generates the predicted action $i_t$ 622 of a single value output action via the fully-connected linear layer 606, followed by the softmax layer 608.

In accordance with implementations of the present disclosure, for each event that has been identified for taking action on, at least one action is determined. In some implementations, the action is executed in an effort to invoke a response from the event. In the example context, the event is a lead (enterprise) and the action is a product/service that is to be presented to the lead. For example, the event can be directly contacted and presented with the action to determine whether to act on the action (e.g., purchase the product/service). As another example, the action can be presented to the event through one or more electronic communication channels. For example, an advertisement for the action can be surfaced in a user interface (UI) that an agent associated with the event uses, in an effort to invoke a response from the event.

Figure 7:
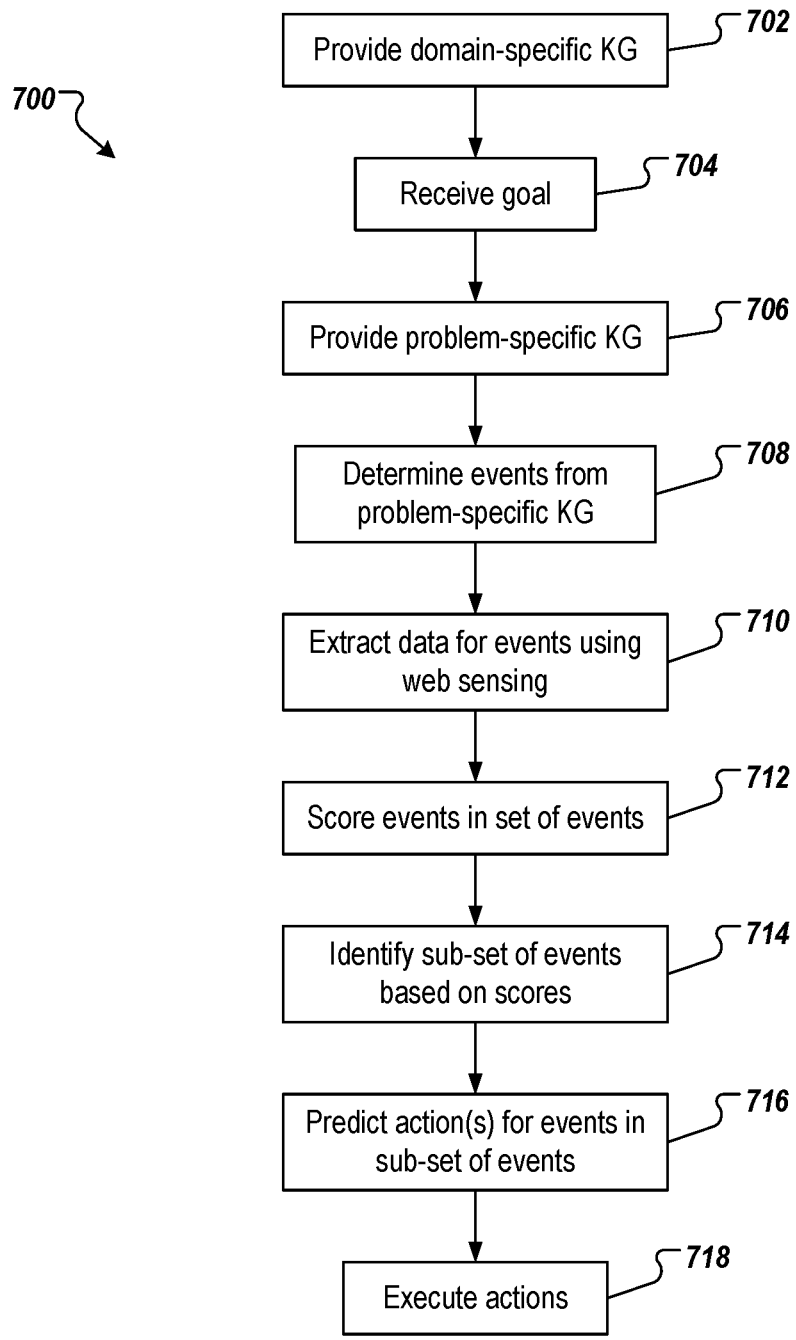
FIG. 7 depicts an example process that can be executed in accordance with implementations of the present disclosure.

FIG. 7 depicts an example process 700 that can be executed in implementations of the present disclosure. In some examples, the example process 700 is provided using one or more computer-executable programs executed by one or more computing devices.

A domain-specific KG is provided (702). For example, and as described herein, one or more domain-specific KGs are provided through the graph modeling engine 216 of FIG. 2 and are stored in the domain-specific KG store 226. In some examples, a domain-specific KG is wholly created. In some examples, a domain-specific KG is updated (i.e., an existing domain-specific KG is updated to add/remove nodes and/or edges). In some examples, a domain-specific KG is provided through a knowledge extraction process and a knowledge fusion process.

A goal is received (704). For example, and as described herein, a goal can be provided to the early pattern detection platform through the event generation workbench 202. For example, the user 120 can interact with the event generation workbench through the computing device 102 to input a goal. In the example of a commercial context, an example goal can include, without limitation, to increase a number of advertisements that SMBs place in online video games through a particular ad network. In some examples, the goal is provided to the event generation engine 204 to trigger event identification and action prediction for each identified event.

A problem-specific KG is provided (706). For example, and as described herein, one or more problem-specific KGs are provided through the graph enrichment engine 216 and are stored in the problem-specific KG store 226. In some examples, a problem-specific KG is created by enriching a domain-specific KG with problem-specific nodes and relationships and, for each problem-specific node, one or more instances relevant to the entity represented by the node.

A set of events is determined from the problem-specific KG (708). For example, and as described herein, the event generation engine 204 processes the problem-specific KG to identify a set of events (e.g., one or more events). In some examples, the set of events is determined based on the goal as a path-finding problem within the problem-specific KG. Data relevant to each event in the set of events is extracted using web sensing (710). For example, and as described herein, the data is provided by the web sensing module 208, which executes web crawling functionality and leverages AI to retrieve data representative of each event in the set of events.

Events in the set of events are scored (712). For example, and as described herein, the set of events and data representative of respective events are provided to the event scoring module 210, which provides an event score for each event. More particularly, the event scoring module scores each event based on data associated with the event from a plurality of data sources. In some examples, the ML model 500 of FIG. 5 receives, for each event, a sparse feature set 502 and a dense feature set 504, which are representative of a respective event, and processes each to provide an event score 506 for the respective event. A sub-set of events is identified based on scores (714). For example, and as described herein, events are ranked based on respective scores, and a threshold score can be used to define the sub-set of events (i.e., events that are to be considered for further processing).

One or more actions are predicted for each event in the sub-set of events (716). For example, and as described herein, the ML model 600 is used to determine an action for an event, where the ML model 600 receives an action sequence 620 relevant to a respective event and processes the action sequence 620 to predict a next action 622 in the action sequence for the respective event. In the context of the present disclosure, the next action 622 represents an action that can be performed with respect to an event. Actions are executed (718). For example, and as described herein, the event can be directly contacted and presented with the action to determine whether to act on the action, and/or the action can be presented to the event through one or more electronic communication channels.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for generating events and actions based on pattern recognition in data of connected networks, the method comprising:
   receiving a goal;
   providing a problem-specific knowledge graph that is responsive to at least a portion of the goal;
   determining a set of events from the problem-specific knowledge graph, wherein determining the set of events comprises:
      mapping at least a portion of entities identified from the goal to corresponding nodes in the problem-specific knowledge graph, and
      identifying a path within the problem-specific knowledge graph that includes the corresponding nodes, wherein the identified path is a minimal path with shortest distances connecting the corresponding nodes;
   processing data representative of events in the set of events through a first machine learning (ML) model to provide a set of event scores, wherein:
      each event score in the set of event scores being associated with a respective event in the set of events, and the first ML model i) processes at least a portion of a sparse feature set of a respective event through an embedding layer to botain a first set of values, ii) processes a dense feature set of the respective event through a hidden layer to obtain a second set of value, and iii) processes the first set of values and the second set of values to provide an event score for the respective event;

determining a sub-set of events based on the set of event scores;

for each event in the sub-set of events, determining at least one action by processing a sequence of actions through a second ML model; and outputting the sub-set of events and a set of actions for execution of at least one action in the set of actions.

2. The computer-implemented method of claim 1, wherein events are determined as respective instances of at least one node in the problem-specific knowledge graph.

3. The computer-implemented method of claim 1, wherein the second ML model receives a sequence of actions associated with a respective event and predicts a next action in the sequence of actions for the respective event.

4. The computer-implemented method of claim 1, wherein the second ML model comprises a set of transformers that process the sequence of actions.

5. The computer-implemented method of claim 1, further comprising, for each event in the set of events, extracting data representative of the event through web sensing.

6. A non-transitory computer-readable storage medium coupled to one or more processors and having instructions stored thereon which, when executed by the one or more processors, cause the one or more processors to perform operations for generating events and actions based on pattern recognition in data of connected networks, the operations comprising:

receiving a goal;

providing a problem-specific knowledge graph that is responsive to at least a portion of the goal;

determining a set of events from the problem-specific knowledge graph, wherein determining the set of events comprises:

mapping at least a portion of entities identified from the goal to corresponding nodes in the problem-specific knowledge graph, and identifying a path within the problem-specific knowledge graph that includes the corresponding nodes, wherein the identified path is a minimal path with shortest distances connecting the corresponding nodes;

processing data representative of events in the set of events through a first machine learning (ML) model to provide a set of event scores, wherein:

each event score in the set of event scores being associated with a respective event in the set of events; and the first ML and i) processes at least a portion of a sparse feature set of a respective event through an embedding layer to obtain a first set of values, ii) processes a dense feature set of the respective event through a hidden layer to obtain a second set of value, and iii) processes the first set of values and the second set of values to provide an event score for the respective event;

determining a sub-set of events based on the set of event scores;

for each event in the sub-set of events, determining at least one action by processing a sequence of actions through a second ML model; and outputting the sub-set of events and a set of actions for execution of at least one action in the set of actions.

7. The non-transitory computer-readable storage medium of claim 6, wherein events are determined as respective instances of at least one node in the problem-specific knowledge graph.

8. The non-transitory computer-readable storage medium of claim 6, wherein the second ML model receives a sequence of actions associated with a respective event and predicts a next action in the sequence of actions for the respective event.

9. The non-transitory computer-readable storage medium of claim 6, wherein the second ML model comprises a set of transformers that process the sequence of actions.

10. The non-transitory computer-readable storage medium of claim 6, wherein operations further comprise, for each event in the set of events, extracting data representative of the event through web sensing.

11. A system, comprising:

a computing device; and a computer-readable storage device coupled to the computing device and having instructions stored thereon which, when executed by the computing device, cause the computing device to perform operations for generating events and actions based on pattern recognition in data of connected networks, the operations comprising:

receiving a goal;

providing a problem-specific knowledge graph that is responsive to at least a portion of the goal;

determining a set of events from the problem-specific knowledge graph, wherein determining the set of events comprises:

mapping at least a portion of entities identified from the goal to corresponding nodes in the problem-specific knowledge graph, and identifying a path within the problem-specific knowledge graph that includes the corresponding nodes, wherein the identified path is a minimal path with shortest distances connecting the corresponding nodes;

processing data representative of events in the set of events through a first machine learning (ML) model to provide a set of event scores, wherein:

each event score in the set of event scores being associated with a respective event in the set of events; and the first ML model i) processes at least a portion of a sparse feature set of a respective event through an embedding layer to obtain a first set of values, ii) processing a dense feature set of the respective event through a hidden layer to obtain a second set of value, and iii) processes the first set of values and the second set of values to provide an event score for the respective event;

determining a sub-set of events based on the set of event scores;

for each event in the sub-set of events, determining at least one action by processing a sequence of actions through a second ML model; and outputting the sub-set of events and a set of actions for execution of at least one action in the set of actions.

12. The system of claim 11, wherein events are determined as respective instances of at least one node in the problem-specific knowledge graph.

13. The system of claim 11, wherein the second ML model receives a sequence of actions associated with a respective event and predicts a next action in the sequence of actions for the respective event.

14. The system of claim 11, wherein the second ML model comprises a set of transformers that process the sequence of actions.

* * * * *

UNITED STATES PATENT AND TRADEMARK OFFICE
CERTIFICATE OF CORRECTION

PATENT NO. : 11,823,019 B2
APPLICATION NO. : 17/370434
DATED : November 21, 2023
INVENTOR(S) : Lan Guan et al.

It is certified that error appears in the above-identified patent and that said Letters Patent is hereby corrected as shown below:

In the Claims

Claim 1, Column 17, Line 3, delete "botain" and insert -- obtain --.

Claim 1, Column 17, Line 9, delete "determing" and insert -- determining --.

Claim 6, Column 17, Line 57, delete "events;" and insert -- events, --.

Claim 6, Column 17, Line 58, delete "and" and insert -- model --.

Claim 11, Column 18, Line 51, delete "events;" and insert -- events, --.

Claim 11, Column 18, Line 55, delete "processing" and insert -- processes --.

Signed and Sealed this
Thirteenth Day of February, 2024

Katherine Kelly Vidal
*Director of the United States Patent and Trademark Office*